United States Patent

O'Hara

Patent Number: 5,912,940
Date of Patent: Jun. 15, 1999

[54] COMBINATION WAVELENGTH AND ENERGY DISPERSIVE X-RAY SPECTROMETER

[76] Inventor: David O'Hara, 4356 David Ct., Tallahassee, Fla. 32308

[21] Appl. No.: 08/871,152

[22] Filed: Jun. 9, 1997

Related U.S. Application Data

[60] Provisional application No. 60/019,497, Jun. 10, 1996.
[51] Int. Cl.⁶ ...................................... G01T 1/36
[52] U.S. Cl. ................. 378/82; 379/49; 379/83; 379/85
[58] Field of Search .................. 378/82–85, 49

[56] References Cited

U.S. PATENT DOCUMENTS

| | | | |
|---|---|---|---|
| 3,920,984 | 11/1975 | Kirkendall | 378/83 |
| 4,131,794 | 12/1978 | Bruninx | 378/83 |
| 4,472,825 | 9/1984 | Jenkins | 378/83 |
| 4,796,284 | 1/1989 | Jenkins | 378/83 |

Primary Examiner—Craig E. Church
Attorney, Agent, or Firm—Allen, Dyer, Doppelt, Milbrath & Gilchrist, P.A.

[57] ABSTRACT

A combination wavelength and energy dispersive x-ray spectrometer comprising a point source of isotropic x-rays, a collimator to collect a large flux of x-rays and to redirect them into a substantially parallel beam, dispersing element means having a plurality of diffracting surfaces to reflect and diffract the parallel beam of x-rays into its component wavelength spectrum, controller means to alter the orientation of the dispersing element relative to the beam of x-rays, position tracking means to identify the orientation of the dispersing element and to provide data output, detector means to receive the reflected beam and to quantify its energy spectrum, wavelength spectrum and to provide data output, data display means to exhibit and record the output provided.

11 Claims, 2 Drawing Sheets

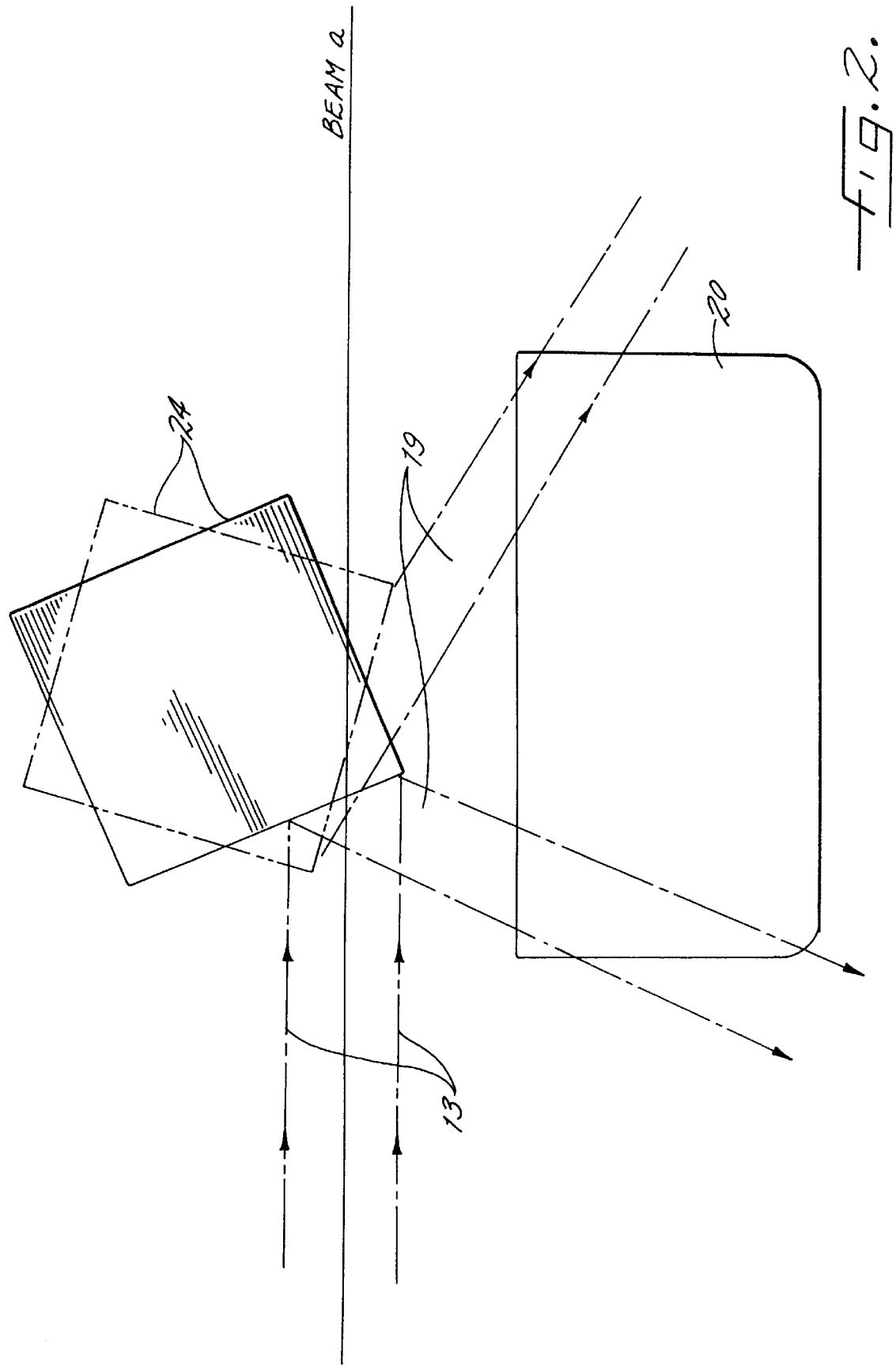

COMBINATION WAVELENGTH AND ENERGY DISPERSIVE X-RAY SPECTROMETER

This application is a continuation-in-part of copending Provisional Patent Application No. 60/019,497, filed on Jun. 10, 1996, for Combination Energy and Wavelength Dispersive X-ray Spectrometer.

BACKGROUND

1. Field of Invention

This invention relates to the field of x-ray spectrometers, specifically to an instrument which is a combination energy dispersive and wavelength dispersive x-ray spectrometer and is capable of very quickly analyzing the elemental composition of an unknown sample by simultaneous application of wavelength dispersive and energy dispersive x-ray spectrometry.

2. Description of Prior Art

X-ray spectroscopy is performed on unknown samples to determine their elemental composition through characterization of x-rays emitted by the sample. X-ray spectroscopy can either be accomplished through energy dispersive methods or wavelength dispersive methods. An energy dispersive spectrometer (EDS) usually relies on pulse height analysis to separate the various x-rays into small energy bins. Pulses are produced when an x-ray impinges on a detector which emits a signal whose amplitude or integrated intensity is a function of the x-ray photon energy. A wavelength dispersive spectrometer (WDS) employs a diffracting element such as a crystal, synthetic multilayer or diffraction grating to separate the incident x-rays into their various wavelengths. The dispersing element is scanned through various angles corresponding to the x-ray wavelengths and the x-rays are diffracted into a detector which also usually moves to intercept these diffracted x-rays. Both systems have various strengths and weaknesses and are usually used separately.

Energy dispersive spectrometers have few or no moving parts and have been developed so that they are easy to use. Unfortunately, they also have poor energy resolution so they are unable to separate closely spaced peaks. For example, N has a spectral line at 0.392 KeV and Ti has a line at 0.452 KeV and they cannot be separated by most energy dispersive spectrometers. There are many other examples where one element in a matrix of another cannot be separated by energy dispersive spectroscopy. In addition, energy dispersive systems are not very efficient at detecting x-rays from the light elements, those with x-ray energies below 1 KeV. However, energy dispersive systems are so much simpler, easier to use and produce a spectrum in shorter time than wavelength dispersive systems that they are used far more than wavelength systems. Data from an EDS is usually displayed as a continuous spectrum, also termed parallel data collection, where peak heights grow as data is collected. Data collection can be terminated when sufficient information has been obtained.

Wavelength dispersive spectrometers typically have many moving parts and are very inefficient, thus data collection times for WDS systems are long. However, resolution is sufficiently good that almost all closely spaced peaks can be separated. Because wavelength systems are good at detecting and resolving low energy peaks, they are typically used for analysis of the light elements. Data is displayed as the crystal or other dispersing element slowly scans over the angles corresponding to the energies of interest. The scan rate is necessarily slow because the collection of x-rays is inefficient, resulting in long data collection times. The spectrum is slowly traced as the diffractor scans, so that it is displayed in a serial manner. The parallel data collection of the energy dispersive spectrometer would be preferred, but due to the slow scan rate, this has not been possible for a WDS before the present invention.

OBJECTS AND ADVANTAGES

Accordingly, several objects and advantages of the present invention are:

a) to provide an x-ray spectrometer that enables a combination of wavelength and energy dispersive spectroscopy to be used together to achieve faster and more sensitive results than either system used separately;

b) to provide a combination wavelength dispersive and energy dispersive x-ray spectrometer which is improved over previous combinations of wavelength and energy dispersive systems;

c) to provide a combination wavelength dispersive and energy dispersive x-ray spectrometer which offers an increase in data collection speed by at least a factor of 5 for the new wavelength dispersive system and which would enable resolution of all potential peak conflicts while the energy dispersive component of the system continues to collects data; for example, the data for the light elements could be obtained by the wavelength dispersive component, while the energy dispersive component collects data for the higher energy elements;

d) to provide a combination wavelength dispersive and energy dispersive x-ray spectrometer which will exhibit data as a continuous display of elemental spectra over the entire range of elements, thereby data for the light elements could be displayed in the same continuous or parallel format as the data for the heavier elements;

e) to provide a combination wavelength dispersive and energy dispersive x-ray spectrometer which increases the effective reflectivity of the dispersing element, or diffractor, thereby making more diffracted x-rays available to the detector;

f) to provide a combination wavelength dispersive and energy dispersive x-ray spectrometer which enables the use of a simpler spectrometer geometry in a smaller package than in current systems;

g) to provide a combination wavelength dispersive and energy dispersive x-ray spectrometer wherein use of a collimator which produces a parallel beam allows the position of the dispersing element to be any practical distance from the x-ray source;

h) to provide a combination wavelength dispersive and energy dispersive x-ray spectrometer whose large gain allows very short data collection times and random access to areas of the spectrum with peak conflicts, rather than serial access as with a conventional wavelength dispersive spectrometers.

DESCRIPTION OF DRAWINGS

FIG. 2 is a top view of the preferred embodiment for the dispersing element, a turret having a plurality of diffracting surfaces, shown as it rotates with an incident parallel beam of x-rays being reflected and diffracted onto the detector.

Figure 1:
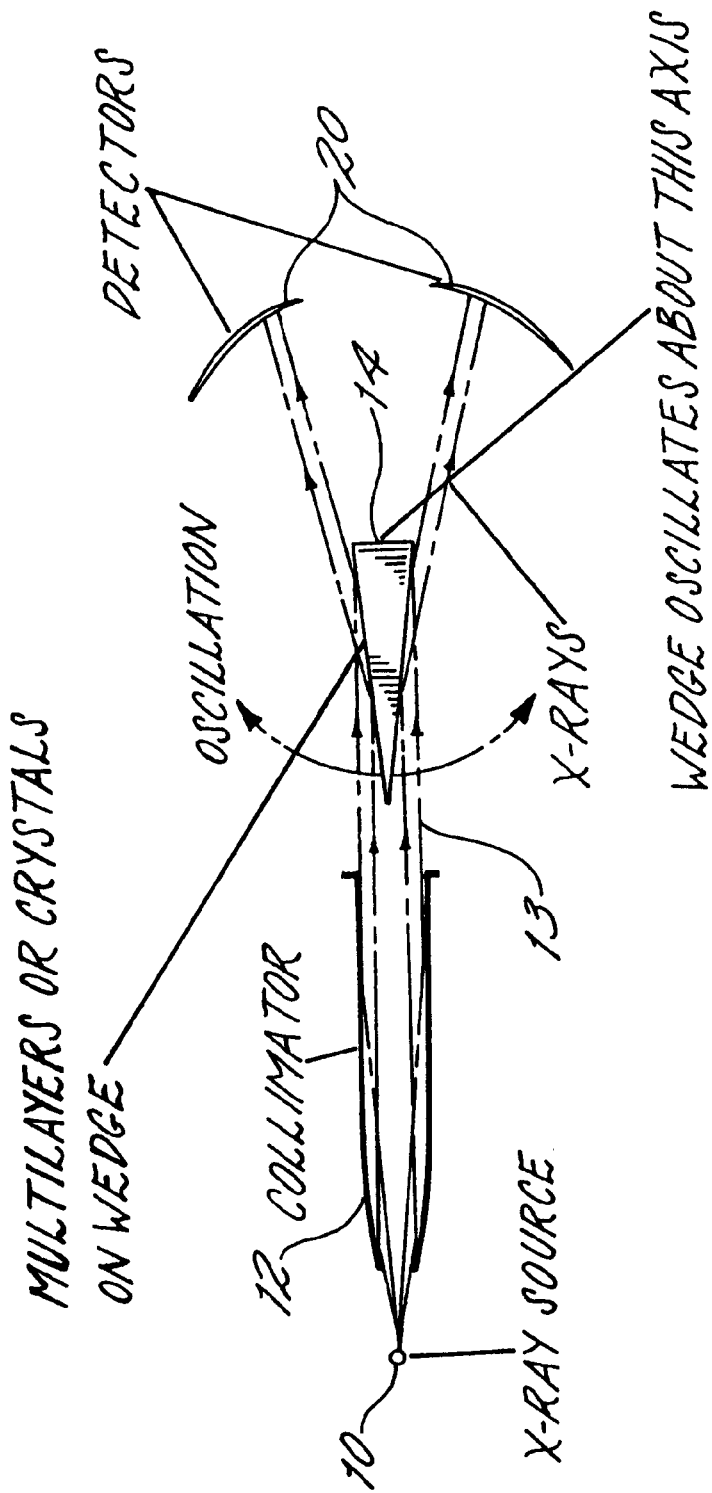
FIG. 1 is a schematic top view of the components of the combination wavelength and energy dispersive x-ray spectrometer, wherein the dispersing element is a wedge.

| List of Reference Numerals | |
|---|---|
| 10 | Point source of isotropic x-rays. |
| 12 | Collimator. |
| 13 | Substantially parallel beam of x-rays. |
| 14 | Dispersing element. |
| 16 | Controller means. |
| 18 | Position tracking means. |
| 19 | Reflected and diffracted x-rays. |
| 20 | Detector means. |
| 22 | Data display means. |
| 24 | Turret embodiment of dispersing element. |

SUMMARY

This invention teaches an analytical instrument which functions as a combination of a wavelength and energy dispersive x-ray spectrometer (WEDS), comprising: a collimating optic to produce a substantially parallel beam (13) of x-rays, which enables arbitrary x-ray source to dispersing element (14) distance, arbitrary dispersing element to detector (20) distance and collection of more x-rays than normally accomplished in a conventional wavelength spectrometer; use of a flat diffractor on a moving dispersing element (14) to enable essentially parallel data collection rather than the usual serial data collection; data collection and display in a random spectral access mode rather than the usual serial access mode; the ability to resolve peak conflicts through the wavelength dispersive component of the instrument, while the energy dispersive component is collecting data; display of the data in a format producing a continuous spectrum; use of means to track the position of the diffractor; one or more diffracting surfaces on each face of the dispersing element (14), each surface diffracting x-rays into the detector (20).

DESCRIPTION OF THE INVENTION

The present invention is a combination wavelength and energy dispersive x-ray spectrometer, or WEDS, relying on a collimator (12) to achieve a count rate of up to 40 times that of a conventional wavelength dispersive spectrometer. The preferred embodiment for the collimator (12), disclosed in copending patent application Ser. No. 08/797,199, produces a large gain in x-ray flux and thereby enables this new type of spectrometer, which is much simpler than current systems. In addition to the collimator (12) described in patent application Ser. No. 08/797,199, any other x-ray collimator which produces a large gain relative to conventional wavelength dispersive spectrometers, three-fold or greater, and collimation better than 5 mrad. will work in this new x-ray spectrometer.

The WEDS allows parallel display of collected data in a manner very similar to that of the energy dispersive systems in common use today. I also propose to use his new system to quickly resolve interferences between peaks. The WEDS enables a combination of the new wavelength spectrometer and an energy dispersive spectrometer to be used together to achieve better results than with either type of instrument used separately. A potential use in conjunction with an energy dispersive system would have the wavelength dispersive system resolving potential energy overlaps while the energy dispersive system collects a full spectrum. The ratio of the two overlapping elements as determined by the wavelength dispersive system would be used in the system software to fit a spectrum to that obtained by the energy dispersive system. This is similar to a system already in use by Oxford, but the increase in data collection speed by at least a factor of 5 for the new wavelength dispersive system would enable resolution of all potential peak conflicts while the energy dispersive system collects data. In addition, the data for the light elements could be obtained by the new wavelength dispersive system while the energy dispersive system collects data for the higher energy elements. The data for these light elements could be displayed in the same format as the data for the heavier elements resulting in a continuous display of elemental spectra over the entire range of elements.

The abilities of this new wavelength dispersive spectrometer are made possible by the use of a collimation system with a high gain and sufficient collimation, as described above, and particularly by the collimator (12) claimed in copending patent application Ser. No. 08/797,199. This collimation system collects a much greater fraction of the x-rays emitted by the source than that collected by conventional wavelength dispersive spectrometers. X-rays leaving the collimator (12) are reflected to form a substantially parallel beam (13) enabling use of a flat dispersing element (14) rather than the curved element of a conventional system. This not only increases the effective reflectivity of the dispersing element (14), but it also enables the use of a simpler spectrometer geometry in a smaller package than conventional systems. Conventional wavelength dispersive systems use curved dispersing elements where the distance between the dispersing element and the x-ray source is determined by the crystal curvature. This also fixes the distance to the detector (20). In a conventional system, the dispersing element must rotate about its axis while it moves along a circular arc while the detector also moves along a circular arc. All of these motions must be accomplished very accurately in vacuum. All of these motions are slow because of the inherent inefficiency of the system.

Use of a collimator (12) which produces a parallel beam (13) allows the position of the dispersing element (14) to be any practical distance from the x-ray source. The detector (20) can be any practical distance from the dispersing element (14). It is no longer necessary to have the complex, expensive and large mechanical system to control the "ballet" between the components of the conventional system, in addition, the large gain allows very short data collection times. Data collection time is no longer limited by the efficiency of the system.

OPERATION OF THE INVENTION

The spectrometer disclosed herein, a combination wavelength and energy dispersive x-ray spectrometer (WEDS), is shown in FIG. 1 and comprises the following as its major components: a point source (10) of isotropic x-rays; a collimator (12) for redirecting the isotropic x-rays into a substantially parallel beam (13); a dispersing element (14) having a plurality of diffracting surfaces, whereby the parallel beam (13) is diffracted into its wavelength spectrum; a controller (16) which moves the dispersing element (14) relative to the incident parallel beam (13); position tracking means (18) to identify the orientation of the diffracting surfaces relative to the parallel beam (13) of x-rays; detector means (20) to receive and quantify the diffracted x-rays (19) and to provide a data output; and data display means (22) to exhibit and record the output of the detector (20).

Briefly, the operation of the WEDS begins with the point source (10) of x-rays, which is the unknown sample being analyzed for its elemental composition. The sample is induced to emit isotropic x-rays by any conventional means. A collimator (12) is located adjacent and sufficiently close to the sample to allow a large flux of the emitted isotropic x-rays to be received by the collimator (12) and redirected into a substantially parallel beam (13). The preferred collimator (12) for the WEDS is a tubular paraboloid which may include a plurality of nested tubular paraboloids and is described in copending patent application Ser. No. 08/797, 199, herein incorporated by reference. This collimator (12) collects far more x-rays than is accomplished in a conventional spectrometer and redirects those x-rays into a substantially parallel beam (13). The parallel beam (13) is aimed toward a dispersing element (14), which may be a wedge or, preferably a turret (24) having two or more diffracting surfaces. One possible simple geometry would have a diffracting surface for one energy range on one face of the dispersing element (14) and another diffracting surface for a different range on another face of the dispersing element (14). The dispersing element (14) moves to present various angles of the diffracting surfaces to the x-ray beam, thus diffracting the x-rays into their various wavelengths. The controller (16) directs the movement of the dispersing element (14) and is driven by a motor. Angular position of the dispersing element (14) is determined by position tracking means (18), preferably by a high resolution optical encoder attached to the shaft on which the dispersing element (14) rides, rather than by an encoder on a gear system which drives the dispersing element (14). Diffracted x-rays (19) are received into detectors (20) adjacent to the dispersing element (14). In the simplest version, the detectors (20) cover part of the circular arc into which diffracted x-rays (19) are directed. Calculations will determine how large a circular arc should be covered by the detectors for optimal performance. Because the distance from the dispersing element (14) to detector (20) is arbitrary in the parallel beam (13) system, these detectors can be located very close to the dispersing element (14), thereby to minimize their required size. Alternatively, a smaller detector (20) can be made to track the movement of the dispersing element (14) in order to intercept the diffracted x-rays (19), however, this will add some complexity to the instrument.

In one operational mode the WEDS would collect data over a wide spectral region. The turret (24) would rotate and on each rotation it would add data to each narrow wavelength bin. Rotations would occur fast enough that data would be presented essentially in a parallel manner as in a conventional EDS. The entire spectrum would "grow" with each rotation until enough data had been collected. Data would be presented as a seamless spectrum with EDS data.

Another mode would be intended to resolve peak conflicts as seen by the EDS component of the system. The turret (24) would be driven to the angle corresponding to the peak conflict and it would then be oscillated about this angle to resolve the peaks. While the EDS is collecting data, many peak conflicts could be resolved and presented as a high resolution, more sensitive display of that area. Areas of peak conflicts could be randomly accessed rather than serially accessed as with a conventional wavelength dispersive spectrometer.

Unlike a typical wavelength dispersive x-ray spectrometer, where a scan of the entire spectrum covered by the instrument may take many minutes, an entire scan with the WEDS will take less than two seconds. Data for each scan will be displayed as it is collected. It will take many such scans to build up the amount of data necessary for good analysis, with the data in each wavelength energy bin added to the sum of data from previous scans. The data display will look just as it does for an energy dispersive spectrometer, with a display of the entire spectrum where the height of the spectral peaks grows with time. This type of data collection is made possible due to the large x-ray flux gain of the system relative to a conventional wavelength dispersive spectrometer and also because the x-ray source-to-diffractor and the diffractor-to-detector (20) distances are arbitrary when a collimator (12) and a flat diffractor are used. A conventional WDS cannot accomplish this because both diffractor and detector must move through large arcs to maintain their correct geometry (Johann or Johannson geometry) and these motions cannot be performed in the small time in which the present spectrometer produces an entire scan. In addition, on a conventional WDS, typically a single diffractor scans through its angles with the detector following along its assigned path, then another diffractor is flipped into the diverging x-ray beam and the diffractor motion and detector motion are repeated for different angles and distances (diffractor Bragg angles and source/diffractor and diffractor/detector distances). These complicated motions make it impossible for a conventional WDS to perform a scan over the entire range that the spectrometer covers in as short a time as the herein described instrument.

The detector (20) in the WEDS is conventional in its x-ray detection process but is, however, fixed in place, unlike the detector in a common WDS, which moves along an arc as the diffractor moves. A regular WDS detector also varies the diffractor/detector distance in order to maintain the correct geometry. The detector (20) in the present spectrometer can be fixed because the use of the collimator (12) and flat diffractor allows almost arbitrary diffractor/detector distance. However, the detector (20) still must intercept the x-rays from the diffractor, which are reflected through various angles as the diffractor moves. In the preferred embodiment of the present spectrometer, the dispersing element (14) comprises a multi-faceted turret (24) having diffracting surfaces and which is rapidly rotated in the collimated beam of x-rays. An alternate embodiment employs a wedge-shaped diffractor which is oscillated in the collimated beam. The detector (20) means in this new instrument must have a large window or sensitive area, one embodiment being a gas flow proportional counter with a window approximately three quarters of an inch wide and four inches long. A long window is used so that as the diffracted x-rays (19) sweep through a large angle, they will sweep over the long window from one end to the other. It is important to note that all wavelength resolution is accomplished by the motion of the dispersing element (24) (the diffracting surfaces) and, therefore, the detector (20) need only count x-rays coming from a flat diffractor. In contrast, a conventional WDS uses a stop with a narrow slit in front of its detector because the curved diffractors used in conventional WDS will diffract a substantial number of x-rays which do not fall into the desired focal area of the curved diffractor. Without the stop, these incorrectly diffracted x-rays would be received on the detector and would contribute to the background noise, rather than to the desired signal. The use of a flat diffractor in a substantially parallel beam (13) of x-rays minimizes this problem, so that the detector (20) does not require shielding through the use of such a stop/slit arrangement.

What is claimed is:

1. An x-ray spectrometer, comprising:
 a) point source means of isotropic x-rays;
 b) a collimator shaped as a reflector comprising a tubular paraboloid of unitary construction, said tubular paraboloid having a focus, an entrance aperture, an exit aperture, and having said point source means disposed substantially at its focus, said tubular paraboloid further comprising a layer of a predetermined material suitable for reflecting x-rays, said isotropic x-rays being received through said entrance aperture and emerging through said exit aperture as a substantially parallel beam;

c) dispersing element means comprising a plurality of diffracting surfaces whereon said substantially parallel beam is received and reflected, thereby the rejected beam being diffracted into its component wavelength spectrum;

d) controller means, bearing said dispersing element means, whereby the orientation of said dispersing element means is altered relative to said substantially parallel beam;

e) position tracking means, thereby to identity the orientation of said diffracting surfaces relative to said substantially parallel beam and to provide data output;

f) detector means to receive said reflected beam and to quantify the energy spectrum and wavelength spectrum of said reflected beam, thereby to provide data output;

g) data display means, whereby the data output provided by said position tracking means and said detector means may be exhibited and recorded.

2. The spectrometer of claim 1, wherein said dispersing element means further comprises a wedge having a plurality of diffracting surfaces whereon said substantially parallel beam of x-rays is received, thereby the beam being diffracted into its component spectrum bands.

3. The spectrometer of claim 2, wherein said wedge further comprises multilayer diffracting surfaces.

4. The spectrometer of claim 2, wherein said wedge further comprises crystal diffracting surfaces.

5. The spectrometer of claim 2, wherein said wedge further comprises multilayer and crystal diffracting surfaces.

6. The spectrometer of claim 1, wherein said dispersing element means further comprises a turret having a plurality of diffracting surfaces whereon said substantially parallel beam of x-rays is received, thereby the beam being diffracted into its component spectrum bands.

7. The spectrometer of claim 6, wherein said turret further comprises multilayer diffracting surfaces.

8. The spectrometer of claim 6, wherein said turret further comprises crystal diffracting surfaces.

9. The spectrometer of claim 6, wherein said turret further comprises multilayer and crystal diffracting surfaces.

10. In combination with an energy dispersive x-ray spectrometer, a wavelength dispersive x-ray spectrometer comprising:

a) point source means of isotropic x-rays;

b) a collimator shaped as a reflector comprising a tubular paraboloid of unitary construction, said tubular paraboloid having a focus, an entrance aperture, an exit aperture, and having said point source means disposed substantially at its focus, said tubular paraboloid further comprising a layer of a predetermined material suitable for reflecting x-rays, said isotropic x-rays being received through said entrance aperture and emerging through said exit aperture as a substantially parallel beam;

c) dispersing element means comprising a wedge having a plurality of diffracting surfaces whereon said substantially parallel beam is received and reflected, thereby the reflected beam being diffracted into its component wavelength spectrum;

d) controller means bearing said dispersing element means, whereby the orientation of said dispersing element means is altered relative to said substantially parallel beam;

e) position tracking means comprising a high-resolution angular position encoder, thereby to identify the orientation of said diffracting surfaces relative to said substantially parallel beam and to provide data output;

f) detector means to receive said reflected beam and to quantify the energy spectrum and wavelength spectrum of said reflected beam, thereby to provide data output;

g) data display means, whereby the data output provided by said position tracking means and said detector means may be exhibited and recorded.

11. The spectrometer of claim 10, wherein said dispersing element means further comprises a turret.

* * * * *